G. H. W. DOOSE.
BICYCLE PROPULSION GEARING.
APPLICATION FILED JULY 2, 1920.

1,388,102. Patented Aug. 16, 1921.

Inventor
G. H. W. Doose,

Witnesses
Wynne Johnson
William A. Smith, Jr.

By
Munn & Co.
Attorney

UNITED STATES PATENT OFFICE.

GABRIEL H. W. DOOSE, OF NEW ORLEANS, LOUISIANA.

BICYCLE PROPULSION-GEARING.

1,388,102.

Specification of Letters Patent. Patented Aug. 16, 1921.

Application filed July 2, 1920. Serial No. 393,651.

*To all whom it may concern:*

Be it known that I, GABRIEL H. W. DOOSE, a citizen of the United States, residing at New Orleans, in the parish of Orleans and State of Louisiana, have invented certain new and useful Improvements in Bicycle Propulsion-Gearing, of which the following is a specification.

This invention relates to an improvement in bicycle transmission gearing and particularly to that type of gearing wherein multiplying gears are interposed between the sprocket-wheel on the crank-shaft and that on the rear wheel for the purpose of speeding up or driving the propelling wheel at a higher speed than the crank-shaft.

An object of this invention is to provide a device of the above mentioned character wherein satisfactory results for the power expended are readily obtained, and wherein a high speed and increased power are attained without the necessity of rapid pedaling on the part of the rider.

A further object of this invention is to provide a device of the above mentioned character which will materially reduce the amount of manual power expended by the rider through the pedals, adapt the cycle for easy hill climbing, increase the speed and power of the bicycle and equalize the driving force.

A still further object of this invention is to provide an improved power transmission gearing for bicycles that is simple in construction, reliable in operation, convenient to actuate and strong and durable.

Figure 1:
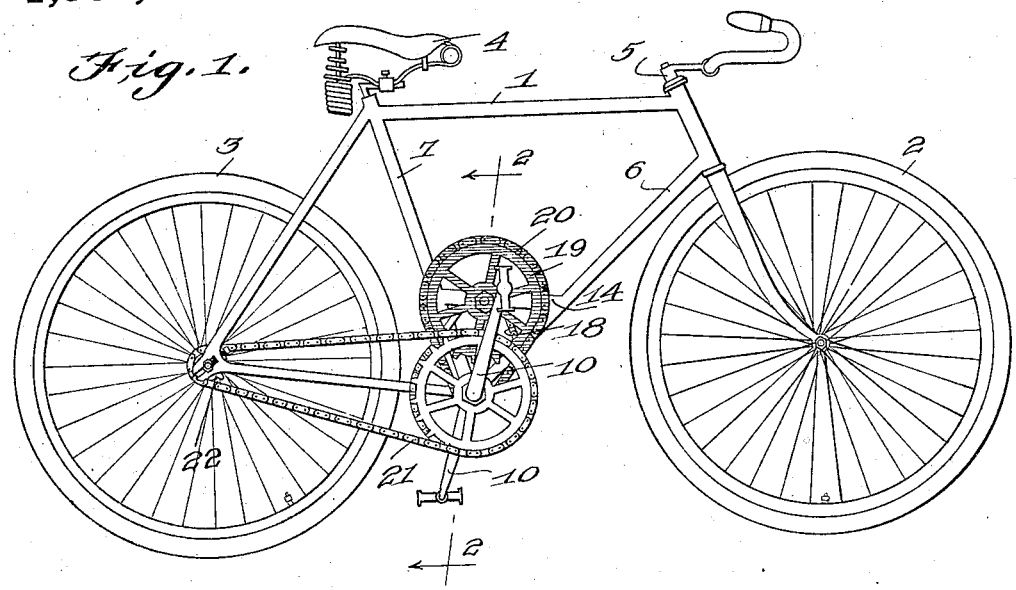
Figure 2:
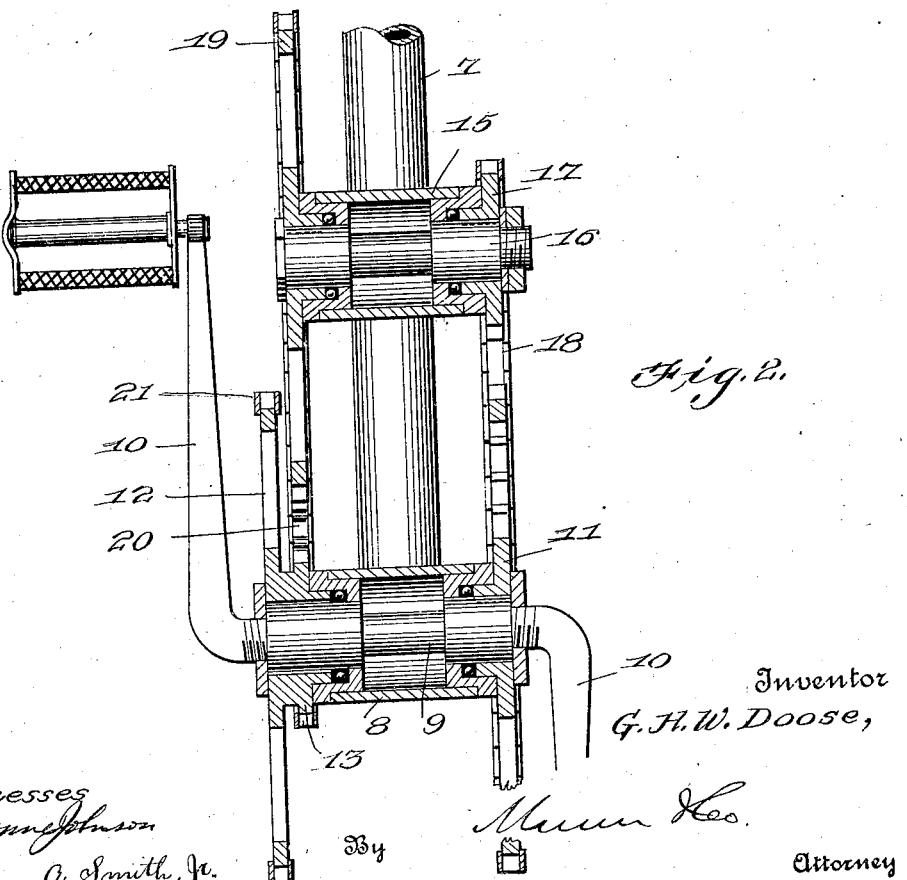

In the accompanying drawings forming a part of this specification and in which like numerals are employed to designate like parts through the several views:

Figure 1 is a side elevation of a bicycle showing my improved system of gearing attached thereto, and Fig. 2 is a sectional view on the line 2—2 of Fig. 1.

Referring specifically to the drawings wherein for the purpose of illustration is shown a preferred embodiment of my invention, the numeral 1 represents a bicycle of any well known or preferred construction, comprising front and rear wheels 2 and 3 respectively, and seat or saddle 4. The steering of the bicycle is accomplished by means of the handle-bar 5.

At the intersection of the forward frame tube 6 and the seat, standard 7 is arranged the transverse tubular supporting sleeve or crank hanger sleeve 8. Within the crank hanger 8 is mounted a crank-shaft 9 to opposite ends of which the pedal-arm 10 are secured. At opposite ends of this crank-shaft 9 are arranged drive sprockets 11 and 12. These sprockets correspond substantially in size and shape and are mounted upon the crank-shaft 9 so that the sprocket 11 is keyed thereto and the sprocket 12 is free to rotate thereon. Concentric with drive sprocket 12 and preferably arranged inwardly thereof is the small sprocket 13 adapted to rotate with drive sprocket 12 as the same rotates about the crank-shaft 9.

Joining the forward frame tube 6 and the seat standard 7 at a suitable point above the crank hanger sleeve 8 is the horizontal supporting bridge 14 intermediate the ends of which is arranged the transverse tubular supporting sleeve 15 within which is mounted the counter-shaft 16 having rigidly secured to one end thereof a small sprocket wheel 17 above and in alinement with the large sprocket wheel 11 and connected thereto by the sprocket chain 18. On the opposite end of the counter-shaft 16 a large sprocket 19 is fixed above and in alinement with the sprocket wheel 13 and connected thereto by sprocket chain 20. A chain 21 connects the large drive sprocket 12 with the rear drive sprocket 22.

It is then obvious that as rotation of the crank-shaft 9 is effected by the pedaling movement of the rider that such rotation will be multiplied or increased by the sprockets 11, 17, 19 and 13, and that such multiplied or increased rotation will be transmitted by drive sprocket 12 and chain 21 to the drive sprocket 22. By reason of the intermediate sprockets interposed between the driven sprocket 11 and the drive sprocket 12 and the relative size and arrangement of the same, the sprocket 12 will be driven at a greater speed than the crank-shaft 9. Due to this arrangement and ratio of gears it will be obvious that the rear driving wheel 3 of the bicycle will be driven at a greater speed than the crank-shaft. By varying the size or ratio of the various gears it is possible to regulate the speed at which the rear wheel may be driven with respect to the speed of rotation of the crank-shaft 9.

It is to be understood that the form of my invention shown and described herein is to be taken as a preferred example of the same and that various changes in size, shape and arrangement of parts may be resorted to without departing from the spirit of the invention or the scope of the subjoined claims.

Having thus described my invention, I claim:

1. The combination with a bicycle frame comprising the usual forward frame tube and seat standard, of a transverse hanger sleeve arranged at the juncture of said forward frame tube and seat standard, a crank-shaft rotatably mounted within the transverse hanger sleeve, a horizontal supporting bridge joining the forward frame tube and seat standard, a transverse tubular supporting sleeve intermediate the ends of said horizontal supporting bridge, a countershaft rotatably mounted within the transverse tubular supporting sleeve, a double sprocket loosely mounted on the crank-shaft, means to transmit the rotation of the crank-shaft to the counter-shaft, means to transmit the rotation of the counter-shaft to one member of the double sprocket, and connecting means between the other member of the double sprocket and the rear drive sprocket of the bicycle.

2. The combination with a bicycle frame comprising the usual forward frame tube and seat standard, of a transverse hanger sleeve at the juncture of said forward frame tube and seat standard, a crank-shaft rotatably mounted within said transverse hanger sleeve, a sprocket rigidly secured to one end of the crank-shaft, a double sprocket loosely mounted on the opposite end of the crank-shaft, a horizontal supporting bridge connecting the forward frame tube and seat standard above the transverse hanger sleeve, a transverse supporting sleeve intermediate the ends of said horizontal supporting bridge, a counter-shaft rotatably mounted within the transverse tubular supporting sleeve, a sprocket rigidly secured to one end of the counter-shaft in alinement with and operatively connected to the sprocket rigidly secured to the crank-shaft, a sprocket rigidly secured to the opposite end of the counter-shaft in alinement with and operatively connected to one member of the double sprocket, and connecting means between the other member of the double sprocket and the rear drive sprocket of the bicycle.

GABRIEL H. W. DOOSE.